Oct. 1, 1957  R. H. KILPATRICK ET AL  2,808,501
APPARATUS AND IMPROVEMENTS FOR HOT FORMING MATERIALS
Filed Nov. 25, 1955  2 Sheets-Sheet 1

INVENTORS
ROBERT HYNDS KILPATRICK
FRANK AIKEN STOVALL
By George C. Sullivan
Agent

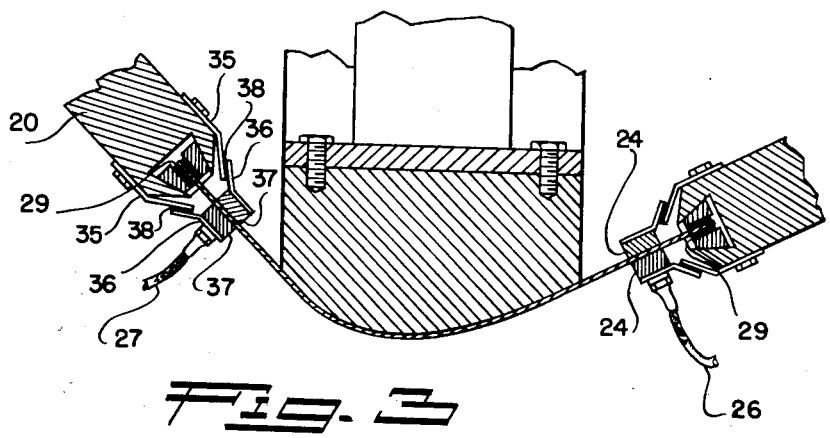
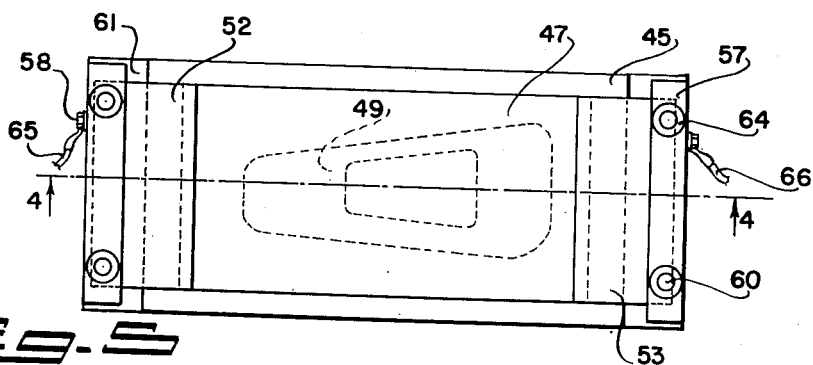
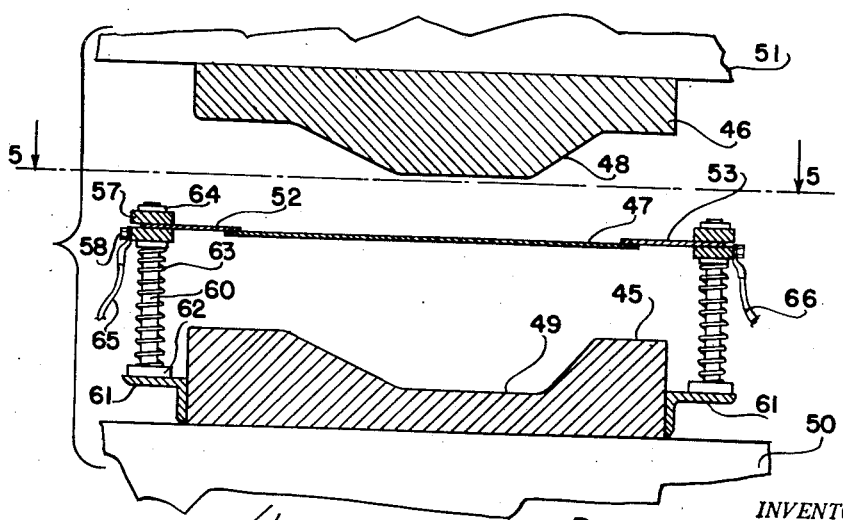

United States Patent Office 2,808,501
Patented Oct. 1, 1957

2,808,501

APPARATUS AND IMPROVEMENTS FOR HOT FORMING MATERIALS

Robert Hynds Kilpatrick, Smyrna, and Frank Aiken Stovall, Atlanta, Ga., assignors to Lockheed Aircraft Corporation, Burbank, Calif.

Application November 25, 1955, Serial No. 548,956

12 Claims. (Cl. 219—154)

This invention relates to apparatus for hot forming material and more particularly to apparatus employing a single die and to improvements for handling and insulating material to be formed.

In the aircraft industry, as well as other industries, it has been found desirable to use punch presses employing conventional resistance heating techniques to form materials such as aluminum, magnesium and titanium. Such a press is described in our copending application entitled, "Method and Apparatus for Hot Forming Material," Serial Number 459,462, filed Sepemtebr 30, 1954. This type of apparatus provides a pair of mating dies configured so that their co-action produces a desired shape in material held therebetween by means of jaws engageable with opposite ends of the material. The material is thermally conditioned by conducting a heavy current therethrough between a pair of electrodes.

Difficulties have been encountered in the employment of this type of apparatus which are due in part to the fact that constructing a pair of mating dies is expensive, time consuming and requires extreme accuracy so that dies will properly mate with each other. In addition, current is often transmitted to areas other than the material where the generated heat is dissipated into the atmosphere and therefore ineffective in thermally conditioning the material. Furthermore, the area of material between the engagement of the jaws and dies is cut away at the end of a forming operation so that over the course of many operations, considerable material waste is accumulated.

These difficulties are overcome in the present invention in which a single die is employed for forming rigid sheet metal. The die is configured so that its shape is transferred to the blank as it is stretched or wrapped around the die. This is accomplished by attaching a pair of jaws carried by a stretch wrapping means to opposite ends of the blank. Heating electrodes are provided between each jaw and the area to be formed so that high electric current may be conducted between the electrodes to thermally condition the blank. To avoid wasteful dissipation of heat provided by flow of current between the electrodes, electric insulating material is placed between each jaw and the blank. In this manner, heat is confined to the area of the blank being formed. Another feature resides in the fact that excessive material waste is avoided by affixing extension tabs to the edges or ends of the blank so that the jaws may engage the tabs. When the forming operation is completed, the tabs may be detached and discarded or re-used. Tabs are preferably constructed from material less expensive than the material being formed. For example, aluminum tabs can be spot welded to a titanium blank.

It is an object of the present invention to provide a tab for extending a suspended blank to points of gripping or clamping electrodes in order to conserve more expensive materials and to permit a blank with angular ends to be evenly supported and to permit an even flow of electrical current through the blank.

It is another object of the present invention to provide suitable electric insulation means between the electrodes providing current and the jaws suspending the blank to be formed.

It is still another object of the present invention to provide suitable electric insulation means between the electrodes providing the electrical current and the tabs carried by the blank.

It is still another object of the present invention to employ hot forming techniques on apparatus having a single die.

These and other objects will be seen more clearly in the following figures and description in which:

Figure 3 is a plan view in section showing a hot forming device employing a single die and further employing insulation means between the jaws of the apparatus and the material;

Figure 4 is an elevational view in section of a hot form punch press showing the use of extension tabs to suspend a blank between mating dies; and Figure 5 is a plan view taken along 5—5 of Figure 4.

Figure 1:
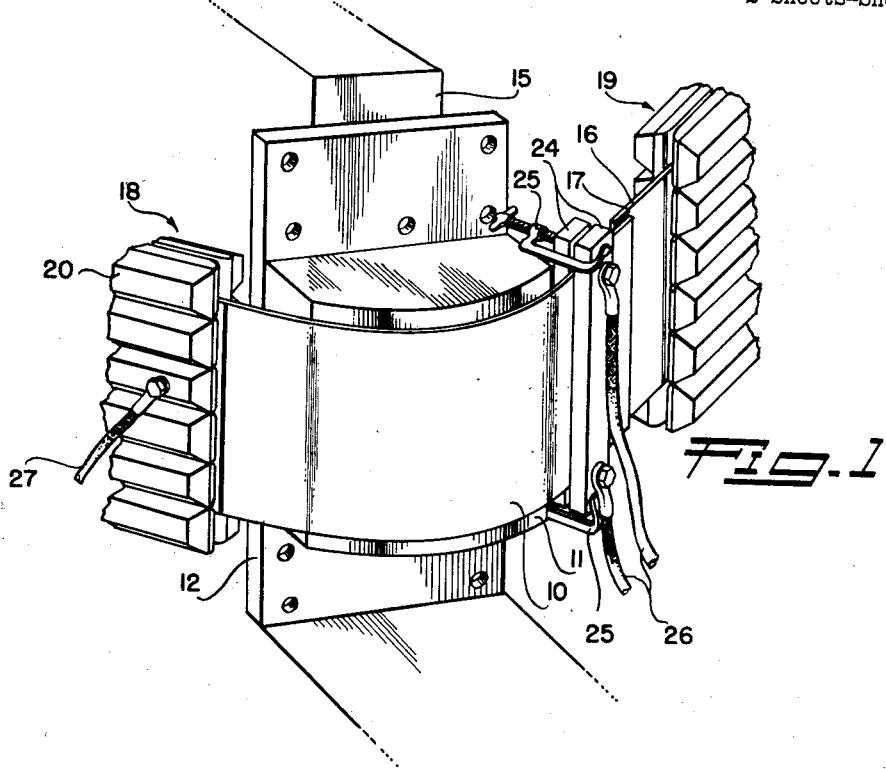
Figure 1 is a perspective view of a hot forming device employing a single die for forming material and an extension tab arrangement in accordance with the present invention.
Figure 2:
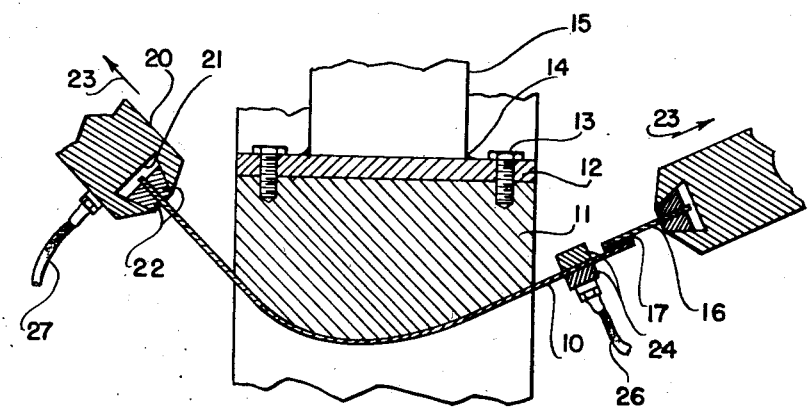
Figure 2 is a plan view in section of the hot forming device employed in Figure 1.

In Figures 1 and 2 apparatus is shown in accordance with the present invention employing stretch wrapping techniques for forming a blank 10 to assume the contour of a single die 11. Die 11 is rigidly mounted on a plate 12 by suitable means such as bolts 13. The die may be constructed from a cast of Kirksite, a zinc alloy, but preferably is constructed from a plastic material such as Rezolin R–72S. The plate is attached as by welds 14 to a base 15 which is composed of material capable of withstanding great pressures and strains.

An extension tab 16 is attached to one end of the blank by a metal bonding means 17 such as by using Normco MN3C tape and M3C primer. The bonding means serves as electrical insulation so that the blank will be electrically isolated from the tab. The tab is composed of readily expendable material in comparison to the blank material. For purposes of explanation, the tab is shown attached to one end of the blank only, but it is to be noted that both ends may be employed to carry extension tabs. The suspension arrangement for the blank comprises jaw sets 18 and 19 clamped against one end of the blank and one end of the tab respectively.

Each jaw in the respective jaw sets, such as jaw 20, is provided with groove 21 converging toward its mouth into which a pair of grips 22 is slidably mounted. Suspension of material 10 is accomplished by inserting the material between the two grips into the groove. When tension is applied in the direction of arrow 23 the grips are forced into tight engagement with the material by means of the grips conforming to and actuated by the convergence of the groove. Employing this type of arrangement provides for a tight connection between the jaw sets and the material as tension increases.

An electrical circuit arrangement for thermally conditioning the blank by resistance heating techniques is provided by electrode bars 24 clamped against the end of the blank carrying the tab. Clamps 25 are employed for this purpose. The electrode bars are suitably connected to a positive source of potential (not shown) via electrical leads 26. A lead-in wire 27 from a source of negative potential, high amperage electricity, such as a transformer or portable arc or spot welding generator (not shown) is attached to the jaw set 18 and completes an electrical circuit through the blank to the electrode bars.

Suspension of the blank renders it unnecessary to interpose insulation between the blank and the die. If desired, the blank may be pre-formed to the approximate curve of the die so that the blank is in a position to be formed by the die. When thermally conditioning the area to be formed, the blank may be held approximately two inches from the die until suitably thermally prepared.

The suspension arrangement employed in the apparatus of Figure 3 is substantially similar to the suspension arrangement in Figure 2 with the exception that an extension tab is not employed and the heating electrodes are carried by the jaw sets and are electrically insulated therefrom. This is accomplished by providing an electrode bar support arrangement comprising a pair of plates 35 bolted to each jaw such as jaw 20 and a pair of plates 36 suitably carrying the electrode bars 24 and an additional pair of electrode bars 37 respectively. The plate pairs are joined by means of a metal bond means 38 similar to the metal bonding means employed in the apparatus of Figures 1 and 2. An alternate method of obtaining electrical insulation of jaw sets is to fabricate support plates 35 from a material which is not an electrical conductor. Leads 26 and 27 are suitably attached to the electrode bars and are connected to an electrical power source (not shown). To electrically isolate the blank from the jaw sets, insulating material 29 such as masking tape or fibre glass cloth may be employed. Insulating material 29 is compressible between the blank ends and the grips slidable within the notch and is provided in each jaw of the jaw sets. Insulating the electrode bars and the blank in this manner permits a high amperage current to pass only through the blank between the electrodes so that unnecessary current will not generate heat in undesirable areas such as the jaw sets.

Figures 4 and 5 show a conventional punch press having a pair of mating dies 45 and 46 for shaping material 47 into a form contoured in accordance with die faces 48 and 49. Die 45 is mounted on a base 50 which resists force applied by die 46. Die 46 is carried by ram 51 and is suspended above the material until the material has been thermally conditioned at which time the die is rapidly lowered.

A pair of extension tabs 52 and 53, similar to the tab 16 employed in the apparatus of Figures 1 and 2 are attached to the blank to be formed by the punch press. The attachment may be by means of a spot-welded connection.

A material suspension arrangement comprises an upper and lower electrode bar 57 and 58 and is apertured to move up and down on posts 60 extending from a support 61 welded on the side of die 45 and is insulated therefrom by support elements 62. These support elements also serve to maintain the posts in an upright position. The bottom electrode bar is supported on springs 63 on the posts 60 which press upwardly to clamp the tab against the upper bar retained on the posts by collars 64. High amperage current is provided to thermally condition the material via leads 65 and 66 attached to the lower electrode bars which are attached to a suitable electrical power source (not shown).

With reference to Figures 1 and 2 the operation for forming blank 10 commences by securing die 11 to plate 12 by means of bolts 13 passing through the plate and engaging the back of the die. Welds 14 rigidly secure the plate carrying the die to the base 15 so that pressures exerted on the die will be suitably resisted by the base. Extension tab 16 affixed to one end of the material by metal bonding means 17 is engaged with die set 19 while the opposite end of the material is engaged in jaw set 18. Engagement of the material is achieved by inserting the material into groove 21 between grips 22 of jaw 20. Slight tension in the direction of arrow 23 causes the grips to travel toward the mouth of the groove and to converge upon the material to form a rigid and tight grip. Electrode bars 24 may now be arranged between the extension tab and the die on one side of the blank and may be held in engagement with the material by means of clamps 25. Electrical leads 26 may be attached to opposite ends of one electrode bar while electrical lead 27 is attached to jaw set 18. This construction and arrangement allows high amperage current flowing from lead 27 to the electrode bars via the blank only. When an electrical insulation bonding means 17 is used to attach extension tab 16 to the material 10, no high amperage current will pass through other portions of the apparatus and thereby the concentration of high amperage current will be confined to the area of the blank being formed. In this manner no heat generated by the high amperage current will be ineffectively induced into other portions of the apparatus and dissipated. Further tension applied in the direction of arrows 23 causes the blank to engage die 11 and as the blank is stretched, the contour of the die is transferred to the blank.

When the blank has been formed sufficiently, tension may be relaxed and the blank including the tab may be removed from the jaw sets and the electrode bars. The extension tab can be removed and discarded as scrap.

Having described only typical apparatus for heating and forming sheet material, we do not wish to be limited to the specific details herein set forth but wish to reserve to ourselves any variations or modifications that may appear to those skilled in the art and falls in the scope of the following claims.

We claim:

1. The method of hot forming metal blanks in a press of the type where a blank held by a gripping means is forced into conformity with a die comprising, suspending the blank adjacent the die, establishing a resistance heating electrical current through the blank while suspended, heating the blank to a desired forming temperature, and activating the gripping means to stretch the suspended blank around the die while thus heated.

2. The method of hot forming metal blanks in a press of the type where a blank held by a gripping means is forced into conformity with a die comprising, suspending the blank in spaced relationship to the die, thermally conditioning the suspended blank to a forming temperature, and activating the gripping means to cause the engagement of the thermally conditioned blank with the die.

3. The method of hot forming metal blanks in a press of the type where a blank held by gripping means is forced into conformity with a die comprising, yieldingly suspending the blank in close proximity to the die, heating the blank to a desired forming temperature, and activating the gripping means to stretch the suspended blank into engagement with the die.

4. The method of hot forming metal blanks in a press of the type where the blank held by a gripping means is forced into conformity with at least one die comprising, suspending the blank adjacent the die, employing electrical resistance heating techniques to thermally condition the blank, heating the blank to a desired forming temperature, and causing relative movement between the gripping means and the die so that the blank engages the die.

5. The method of hot forming metal blanks in a press of the type where the blank held by a gripping means is forced into conformity with a die comprising, yieldingly suspending the blank in close proximity to the die, passing a high amperage current through the blank which establishes resistance heating, heating the blank to a desired forming temperature, and immediately activating the gripping means to force the suspended blank into engagement with the die.

6. The method set forth in claim 5 including, electrically insulating the gripping means from the blank.

7. The method of hot forming metal blanks in a press having at least one die against which the blank is forced into conformity comprising, attaching extension tabs onto at least one end of the blank, suspending the blank including the tabs in close proximity to the impression in the die, electrically heating the blank for thermally preparing the blank for forming, and stretching the blank under pressure over the die.

8. The method set forth in claim 7 including, electrically insulating the tabs from the blank.

9. In a press of the type having a single die used to form a blank into conformity with the die, the combination comprising, a gripping means for suspending the blank in spaced relationship to the die, an electrical resistance heating means for thermally conditioning the blank, and means for activating the gripping means to engage the blank with the die.

10. The elements set forth in claim 9 including means for electrically insulating the blank from the gripping means.

11. In a press of the type having a single die used to form a blank into conformity with the die, the combination comprising, means for suspending the blank in close proximity of the die, means for electrically heating the suspended blank to a forming temperature, and gripping means associated with the means for suspending the blank for applying tension on the suspended blank and wrapping the blank around the die in engagement with the die.

12. In a press of the type having at least one contoured die employed to form a blank into conformity with the contour of the die, the combination comprising, extension means carried by the blank, suspension means for suspending the blank including the extension means in spaced relationship to the contour of the die, and means for activating the suspension means to engage the blank with the contour of the die.

References Cited in the file of this patent

UNITED STATES PATENTS

| | | |
|---|---|---|
| 1,112,779 | Forsyth | Oct. 6, 1914 |
| 2,443,336 | Waldie | June 15, 1948 |